United States Patent
Mullett

(10) Patent No.: US 11,524,547 B2
(45) Date of Patent: Dec. 13, 2022

(54) VEHICLE HEATING, VENTILATION, AND AIR CONDITIONING SYSTEM

(71) Applicant: DENSO International America, Inc., Southfield, MI (US)

(72) Inventor: Reilly Mullett, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 17/203,135

(22) Filed: Mar. 16, 2021

(65) Prior Publication Data
US 2022/0024276 A1 Jan. 27, 2022

Related U.S. Application Data

(60) Provisional application No. 63/055,012, filed on Jul. 22, 2020.

(51) Int. Cl.
*B60H 1/00* (2006.01)

(52) U.S. Cl.
CPC ..... *B60H 1/00028* (2013.01); *B60H 1/00064* (2013.01); *B60H 2001/002* (2013.01)

(58) Field of Classification Search
CPC ............ B60H 1/00028; B60H 1/00064; B60H 1/00671; B60H 1/00678; B60H 1/00685; B60H 1/00564; B60H 1/00864; B60H 2001/002; B60H 2001/00092; B60H 1/00521
See application file for complete search history.

(56) References Cited

U.S. PATENT DOCUMENTS

| 5,181,553 | A | * | 1/1993 | Doi | B60H 1/00842 |
| | | | | | 165/203 |
| 6,311,763 | B1 | * | 11/2001 | Uemura | B60H 1/247 |
| | | | | | 62/244 |
| 9,248,719 | B2 | * | 2/2016 | Kang | B60H 1/00064 |

(Continued)

FOREIGN PATENT DOCUMENTS

| EP | 3081410 A2 | * | 10/2016 | ......... B60H 1/00021 |
| JP | 4253960 B2 | * | 4/2009 | ......... B60H 1/00028 |

(Continued)

OTHER PUBLICATIONS

KR 20050109784 A English Machine Translation (Year: 2005).*
KR 20030019702 A English Machine Translation (Year: 2003).*
KR 20120085049 A English Machine Translation (Year: 2012).*

*Primary Examiner* — Jenna M Hopkins
(74) *Attorney, Agent, or Firm* — Harness, Dickey & Pierce, P.L.C.

(57) ABSTRACT

An HVAC assembly for a vehicle. The HVAC assembly has an HVAC case with a rear blower and an evaporator. A rear blower scroll directs airflow generated by the rear blower to a lower portion of the evaporator. An airflow conduit is configured to direct airflow generated by a front blower to an upper portion of the evaporator. An airflow divider separates airflow generated by the rear blower from airflow generated by the front blower. The airflow divider divides the HVAC case into an upper area above the divider and a lower area below the divider. A defrost outlet and a front face outlet are at the upper area of the HVAC case above the divider. A front foot outlet and a rear airflow outlet are at the lower area of the HVAC case below the divider.

16 Claims, 8 Drawing Sheets

(56) References Cited

U.S. PATENT DOCUMENTS

2018/0326812 A1* 11/2018 Ko .................... B60H 1/00685
2022/0024276 A1* 1/2022 Mullett ............. B60H 1/00028

FOREIGN PATENT DOCUMENTS

| KR | 20030019702 A | * | 2/2003 | ............... B60H 1/00 |
| KR | 20050109784 A | * | 11/2005 | ............... B60H 1/00 |
| KR | 20120085049 A | * | 7/2012 | |
| KR | 2020069522 A | * | 6/2020 | ......... B60H 1/00028 |

* cited by examiner

VEHICLE HEATING, VENTILATION, AND AIR CONDITIONING SYSTEM

CROSS-REFERENCE TO RELATED APPLICATION

This application claims the benefit of U.S. Provisional Application No. 63/055,012 filed on Jul. 22, 2020, the entire disclosure of which is incorporated herein by reference.

FIELD

The present disclosure relates to a vehicle heating, ventilation, and air conditioning (HVAC) system including a rear blower configured to direct airflow to a front foot area of a passenger cabin.

BACKGROUND

This section provides background information related to the present disclosure, which is not necessarily prior art.

Vehicle heating, ventilation, and air conditioning (HVAC) systems include a front blower for circulating airflow. In some vehicles, only the front blower is included. In other vehicles, such as large vehicles with third row seating, a rear blower is included in addition to the front blower for circulating airflow about a rear of the vehicle. While current HVAC systems are suitable for their intended use, they are subject to improvement. The present disclosure provides for an improved HVAC system including at least the advantages and unexpected results set forth herein.

SUMMARY

This section provides a general summary of the disclosure, and is not a comprehensive disclosure of its full scope or all of its features.

The present disclosure includes an HVAC assembly for a vehicle. The HVAC assembly has an HVAC case with a rear blower including a rear blower scroll configured to direct airflow generated by the rear blower to a lower portion of an evaporator. An airflow conduit is configured to direct airflow generated by a front blower to an upper portion of the evaporator. An airflow divider separates airflow generated by the rear blower from airflow generated by the front blower. The airflow divider divides the HVAC case into an upper area above the divider and a lower area below the divider. A defrost outlet and a front face outlet are at the upper area of the HVAC case above the divider. A front foot outlet and a rear airflow outlet are at the lower area of the HVAC case below the divider.

The present disclosure further includes an HVAC assembly for a vehicle having a front blower case with a front blower. An HVAC case is connected to the front blower case by an airflow conduit. The HVAC case includes a rear blower, an evaporator, a front foot outlet, and an airflow divider separating airflow generated by the rear blower from airflow generated by the front blower. The airflow divider divides the HVAC case into an upper area above the divider and a lower area below the divider. The front foot outlet is below the divider.

The present disclosure still further provides for an HVAC assembly for a vehicle. The HVAC assembly has a front blower case including a front blower. An HVAC case is connected to the front blower case by an airflow conduit. The HVAC case includes a rear blower. An airflow divider of the HVAC case separates airflow generated by the rear blower from airflow generated by the front blower. The airflow divider divides the HVAC case into an upper area above the divider and a lower area below the divider. A defrost outlet and a front face outlet are at the upper area of the HVAC case above the divider. A front foot outlet and a rear airflow outlet are at the lower area of the HVAC case below the divider.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
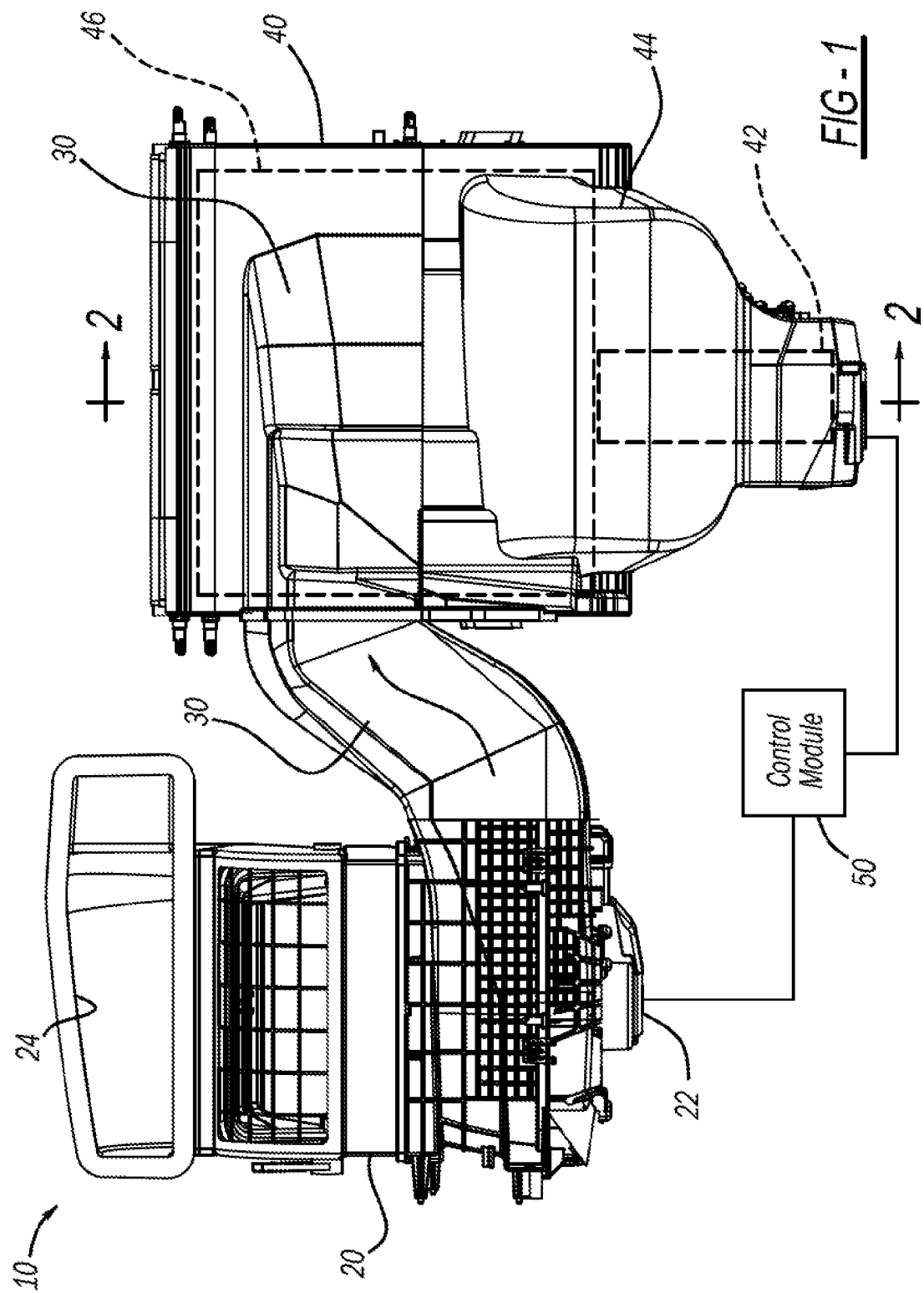
FIG. 1 illustrates an exemplary heating, ventilation, and air conditioning (HVAC) system in accordance with the present disclosure, the HVAC system including both a front blower and a rear blower.

FIG. 1 illustrates an exemplary heating, ventilation, and air conditioning (HVAC) assembly 10 in accordance with the present disclosure. As described herein, the HVAC assembly 10 is configured for installation in a vehicle. The HVAC assembly 10 may be configured for installation in any suitable vehicle, such as any suitable passenger vehicle, mass transit vehicle, utility vehicle, recreational vehicle, military vehicle/equipment, construction vehicle/equipment, watercraft, aircraft, etc. The HVAC assembly 10 may also be configured for use in any suitable non-vehicular application.

The HVAC assembly 10 includes a front blower case 20 with a front blower 22. An airflow conduit 30 connects the front blower case 20 to an HVAC case 40. Airflow generated by the front blower 22 flows through the airflow conduit 30 into the HVAC case 40. The HVAC case 40 includes a rear blower 42 and a rear blower scroll 44. The rear blower 42 and the front blower 22 generate airflow that is directed through an evaporator 46 and a heater core 48 (FIG. 2, for example), as described further herein.

The front blower 22 and the rear blower 42 are controlled by a control module 50. In this application, including the definitions below, the term "control module" may be replaced with the term "circuit." The term "control module"

may refer to, be part of, or include processor hardware (shared, dedicated, or group) that executes code and memory hardware (shared, dedicated, or group) that stores code executed by the processor hardware. The code is configured to provide the features of the control module 50 described herein.

Figure 2:
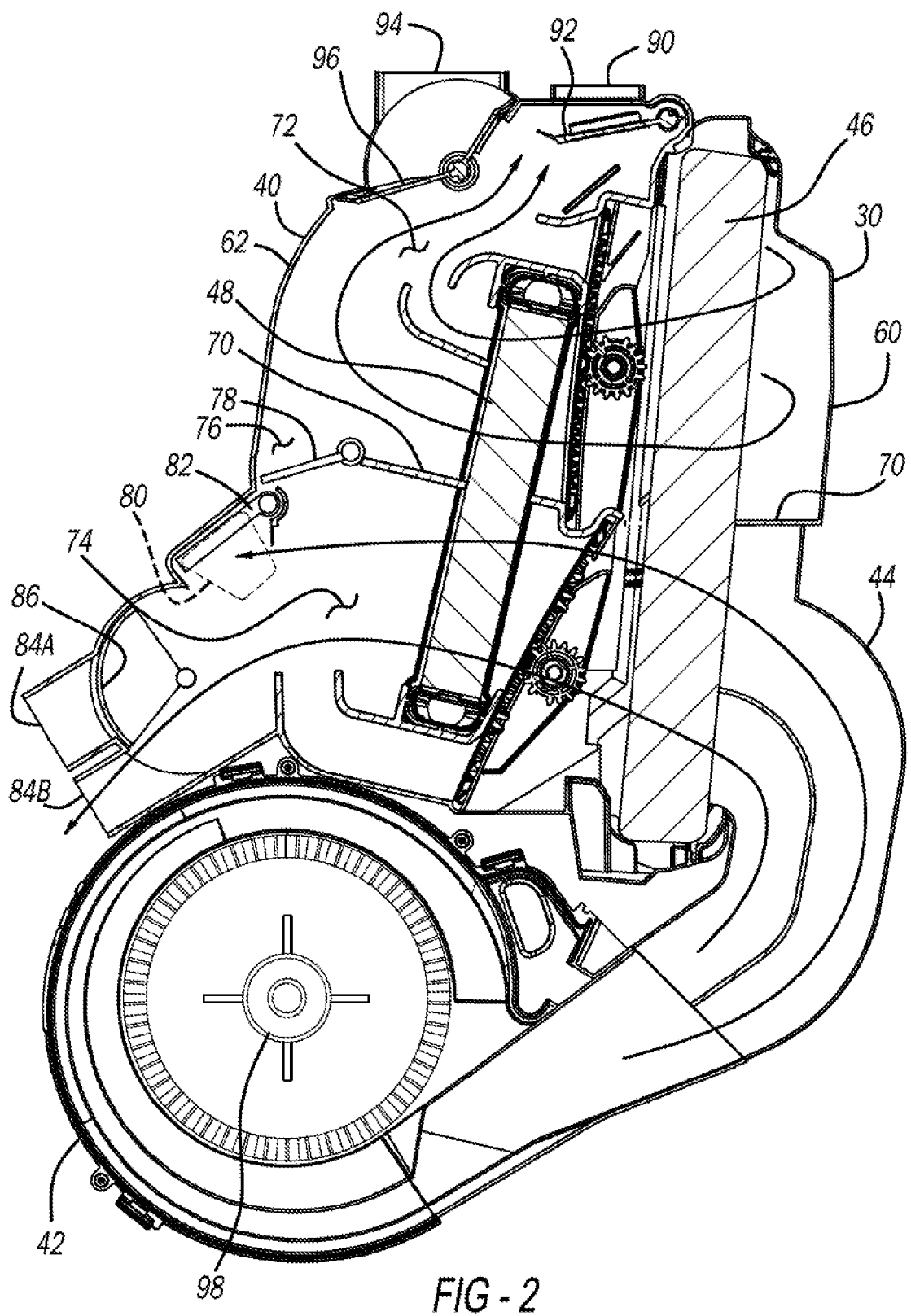
FIG. 2 is a cross-sectional view taken along line 2-2 of FIG. 1 of an HVAC case of the HVAC assembly of FIG. 1 in a front and rear heat mode.
Figure 3:
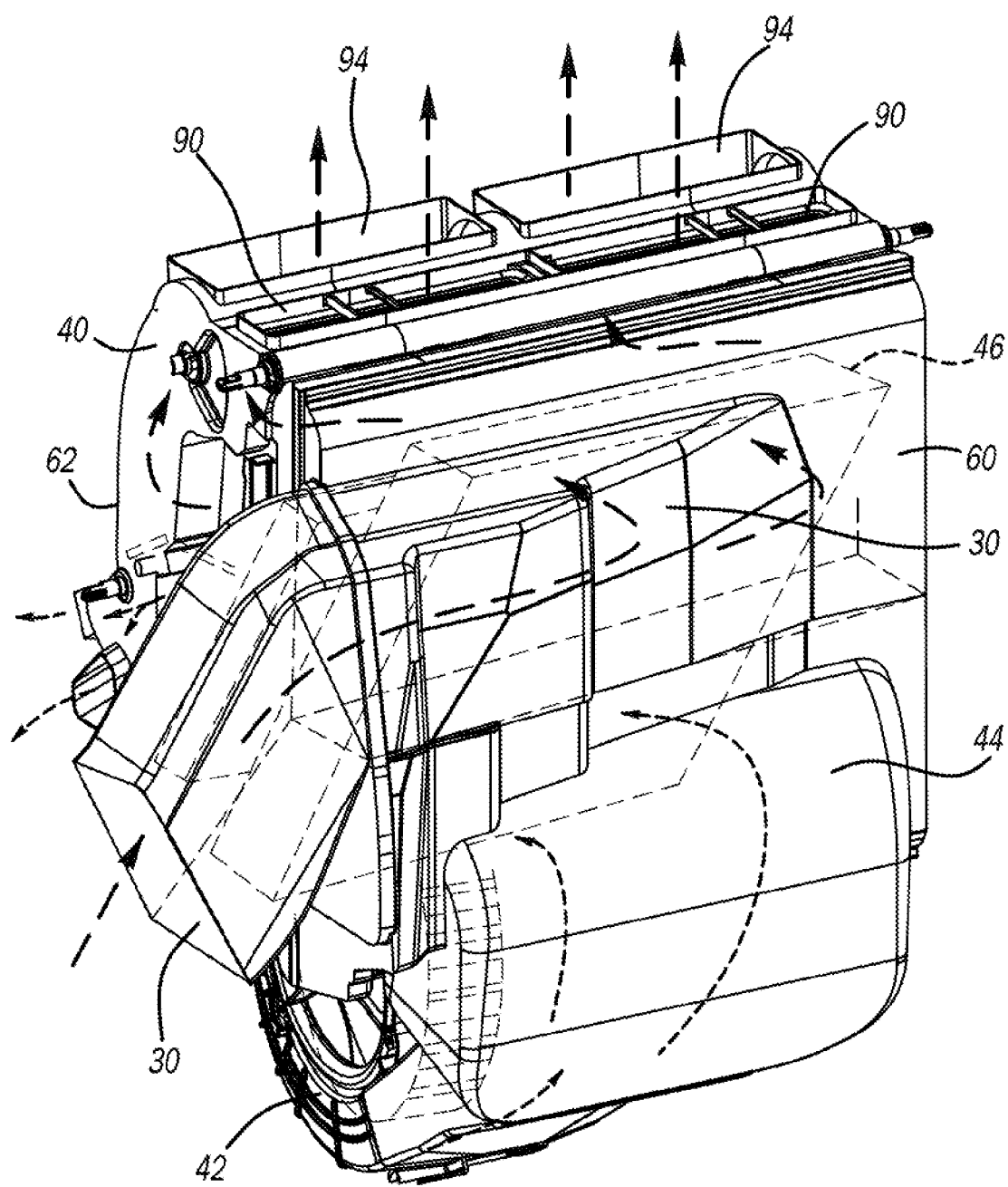
FIG. 3 is a perspective view of the HVAC case.

With continued reference to FIG. 1 and additional reference to FIGS. 2 and 3, the HVAC case 40 will now be described in additional detail. The HVAC case 40 has a front side 60 and a rear side 62, which is opposite to the front side 60. The HVAC case 40 is configured to be installed in a vehicle such that the front side 60 faces a front end of the vehicle, and the rear side 62 faces a rear of the vehicle.

The HVAC case 40 includes a divider 70, which generally divides the interior of the HVAC case 40 into an upper portion 72 and a lower portion 74. The upper portion 72 is opposite to the airflow conduit 30. Thus, airflow generated by the front blower 22 flows through the airflow conduit 30, through the evaporator 46, and through the heater core 48 into the upper portion 72. The rear blower scroll 44 is aligned with the lower portion 74. Thus, airflow generated by a rotor 98 of the rear blower 42 flows through the evaporator 46 and the heater core 48 into the lower portion 74. The airflow conduit 30 is opposite to an upper portion of the evaporator 46 and the rear blower scroll 44 is opposite to a lower portion of the evaporator 46.

The divider 70 generally separates airflow generated by the front blower 22 from airflow generated by the rear blower 42. The divider 70 at least partially defines a bypass opening 76. Adjacent to the bypass opening 76 is a bypass door 78, which controls airflow through the bypass opening 76. When the bypass door 78 is open, airflow generated by the rear blower 42 is able to flow from the lower portion 74 into the upper portion 72.

At the lower portion 74, the HVAC case 40 defines a front foot outlet 80. The front foot outlet 80 is at or adjacent to the rear side 62. The front foot outlet 80 is in communication with any suitable airflow duct such that airflow through the front foot outlet 80 flows to the front foot area of the vehicle that the HVAC assembly 10 is installed in. Thus, airflow generated by the rear blower 42 flows to the lower portion 74, exits the HVAC case 40 through the front foot outlet 80, and flows to the front foot area of the vehicle when front foot control door 82 is open. The HVAC case 40 further defines a rear face outlet 84A and a rear foot outlet 84B. The rear face outlet 84A and rear foot outlet 84B cooperate with any suitable ducting of the vehicle, such that airflow exiting the HVAC case 40 through the rear face outlet 84A and the rear foot outlet 84B flows to a rear face and foot area respectively of the vehicle that the HVAC assembly 10 is installed in.

The HVAC case 40 further defines defrost outlets 90 at the upper portion 72. Airflow through the defrost outlets 90 is controlled by defrost outlet control door 92. The HVAC case 40 also defines front face outlets 94 at the upper portion 72. Airflow through the front face outlets 94 is controlled by front face outlet control door 96.

Airflow enters the front blower case 20 through inlet 24. The inlet 24 is in cooperation with airflow ducts leading to an exterior of the vehicle. Thus when activated, the front blower 22 draws in fresh air from an exterior of the vehicle, and pushes the fresh air through the airflow conduit 30 into the upper portion 72 of the HVAC case 40. When activated, the rear blower 42 draws recirculated cabin air into the HVAC case 40. The recirculated cabin air exits the HVAC case 40 primarily through the foot outlets 80, 84B. The HVAC assembly 10 is thus advantageously a two-layer HVAC, whereby the rear blower 42 recirculates cabin air throughout a lower portion of the passenger cabin, which allows the passenger cabin to be heated faster, and with less energy, as compared to one-layer HVAC systems that do not separate lower recirculated airflow from upper fresh airflow. The two-layer system of the present disclosure further advantageously reduces the likelihood of window fogging because fresh air is circulated throughout the upper area of the passenger cabin.

Figure 4:
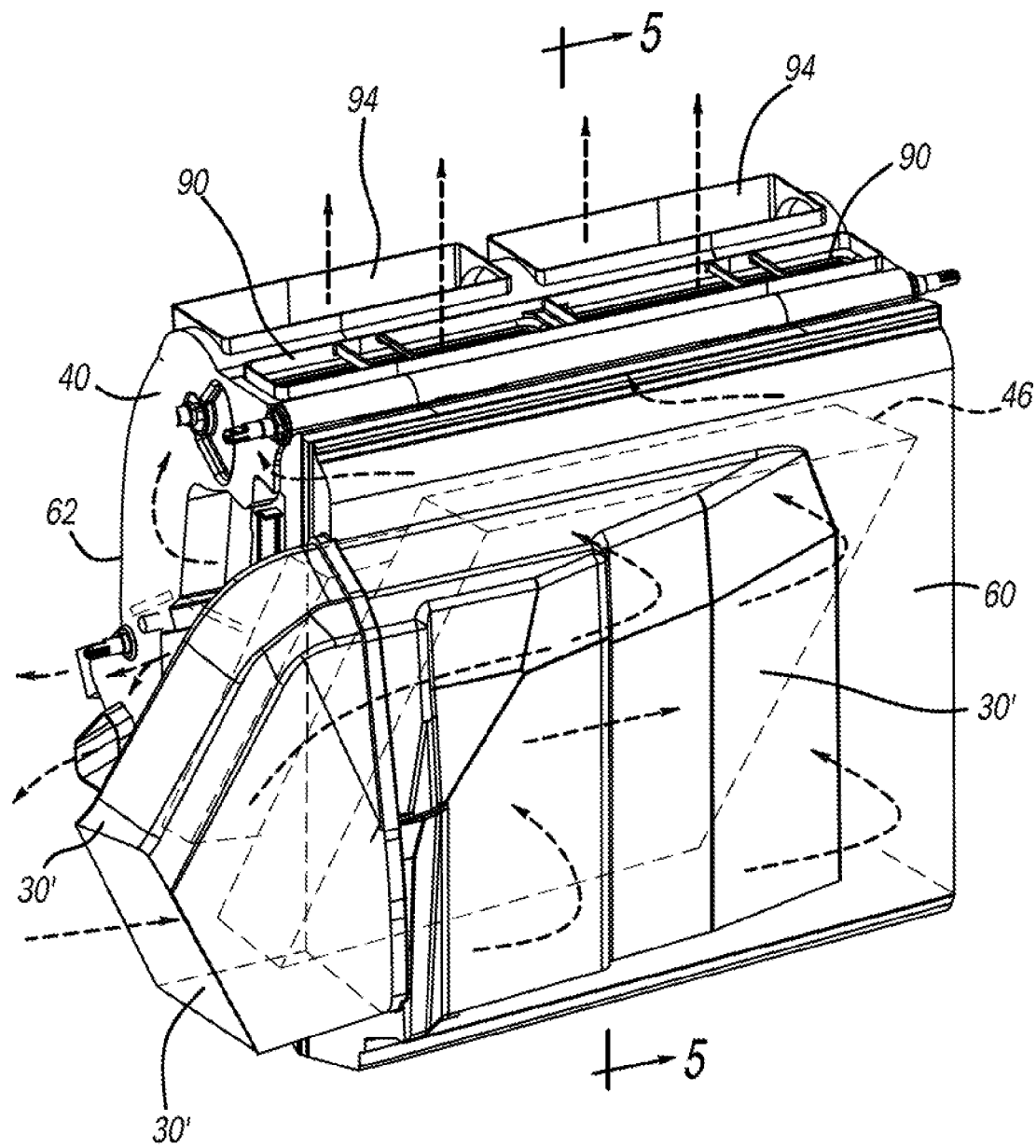
FIG. 4 is a perspective view of the HVAC case configured for use without the rear blower.
Figure 5:
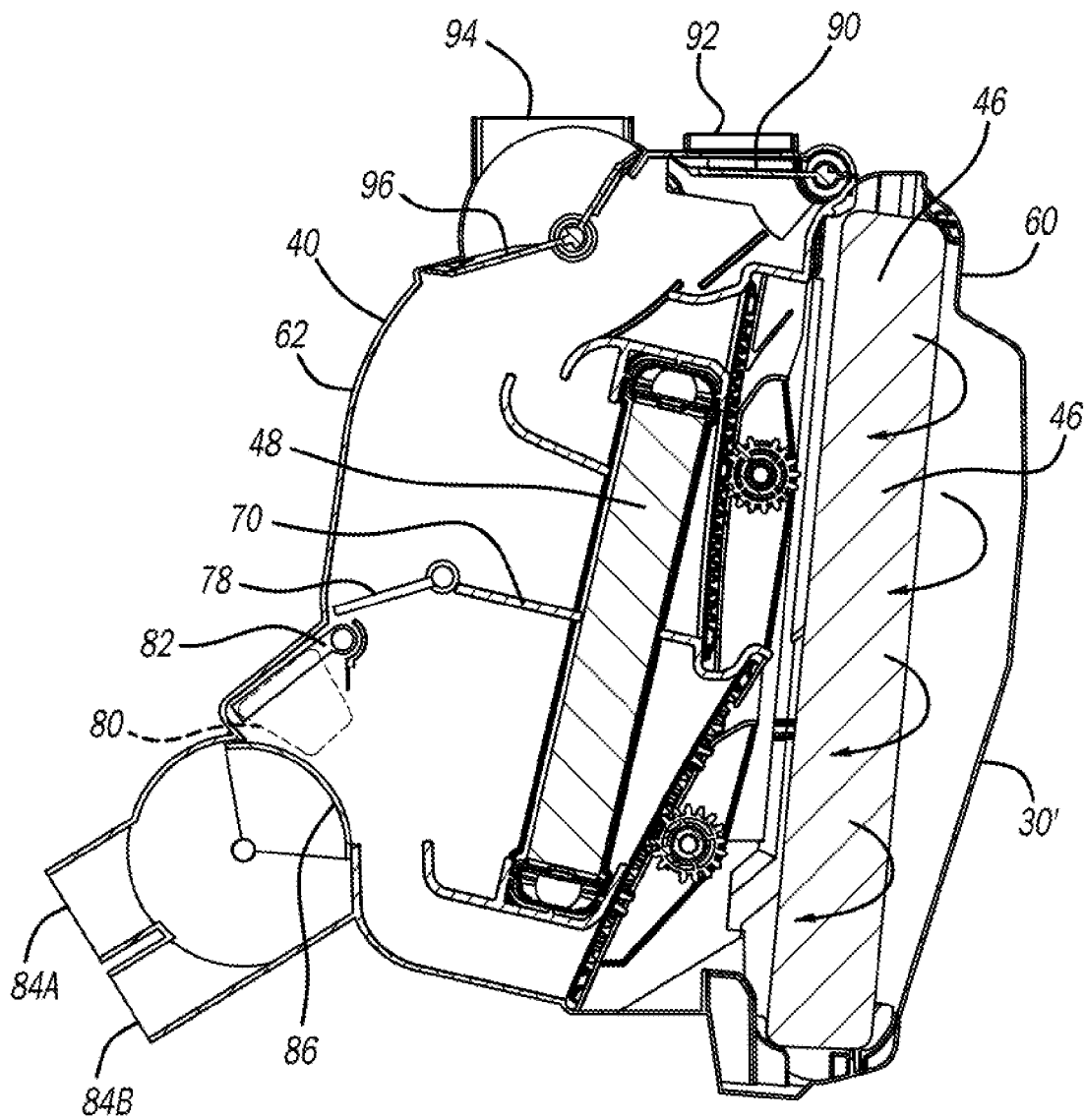
FIG. 5 is a cross-sectional view taken along line 5-5 of FIG. 4.

With reference to FIGS. 4 and 5, the HVAC case 40 can advantageously be easily modified for use in a vehicle without rear passenger area foot vents. In such applications, the rear blower 42 and the rear blower scroll 44 are removed. The airflow conduit 30 is replaced with a modified airflow conduit 30', which is vertically larger than the airflow conduit 30. The airflow conduit 30' is opposite to both upper and lower portions of the evaporator 46. Thus, airflow generated by the front blower 22 flows through the airflow conduit 30' across an entirety of the evaporator 46 and the heater core 48 into both the upper portion 72 and the lower portion 74 of the HVAC case 40. With the rear blower 42 and the rear blower scroll 44 removed, the HVAC case 40 may include any suitable cover or plug in place of the rear blower scroll 44. The HVAC assembly 10 may thus advantageously be configured for installation in vehicles having rear cabin foot vents, as well as vehicles without rear cabin foot vents.

The control module 50 is configured to operate the front blower 22, the rear blower 42, and airflow control doors 78, 82, 86, 92, and 96 to configure the HVAC assembly 10 in a plurality of different HVAC modes to provide cool airflow, warm airflow, and/or defrost airflow. FIG. 2 illustrates the HVAC assembly 10 in a heat mode for heating front and rear portions of a vehicle passenger cabin. In the heat mode, the control module 50 activates the front blower 22 and the rear blower 42, and operates the front blower 22 and the rear blower 42 at the same, or similar, voltage so that the front and rear blowers 22, 42 are running at the same speed, or generally the same speed. The control module 50 opens both the front foot control door 82 and the rear airflow control door 86 to direct heated airflow out of the HVAC case 40 through the front foot outlet 80 and the rear foot outlet 84B to the lower areas of the front and rear passenger cabin for heating the feet of front occupants and rear occupants. The control module 50 closes the bypass door 78 so that all airflow generated by the rear blower 42 flows out through the front foot outlet 80 and the rear foot outlets 84. In the heat mode of FIG. 2, the control module 50 also closes the front face outlet control door 96, and slightly opens the defrost outlet 90 to allow airflow from the front blower 22, which has been heated by the heater core 48, to exit the HVAC case 40 through the defrost outlet 90. The heat mode of FIG. 2 is a two-layer mode whereby both the front foot outlet 80 and the rear outlets 84A, 84B receive recirculated, heated airflow. Efficiencies are achieved because airflow to the front feet is recirculated (not fresh) thereby reducing warm-up time and increasing defrost airflow.

Figure 6:
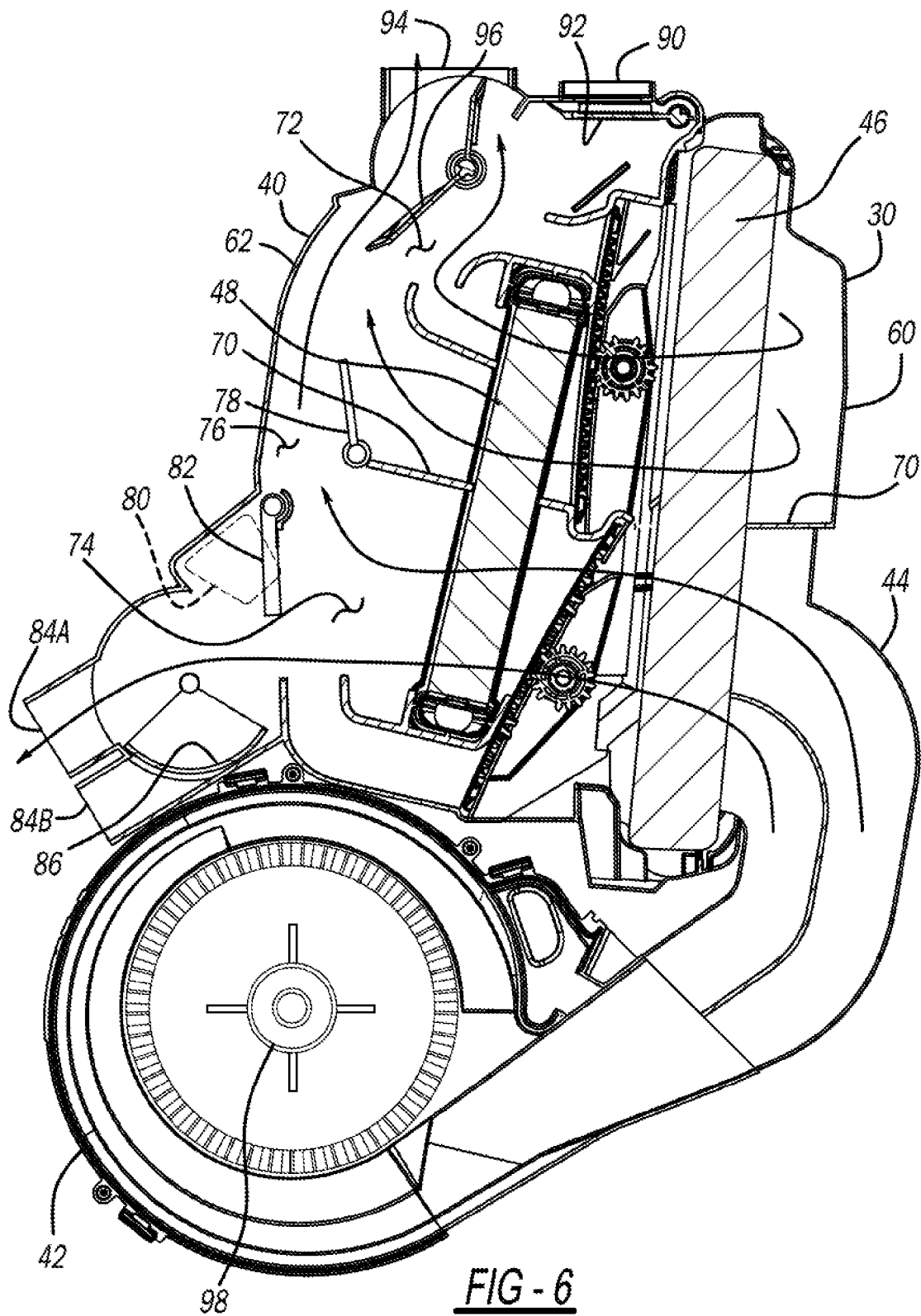
FIG. 6 is a cross-sectional view similar to FIG. 2, but with the HVAC case configured in a vent mode.

FIG. 6 illustrates the HVAC assembly 10 in a vent mode. In the vent mode, the control module 50 opens the bypass door 78 to allow airflow generated by the rear blower 42 to flow from the lower portion 74 to the upper portion 72. The control module 50 opens the front face outlet control door 96 to allow airflow from both the rear blower 42 and the front blower 22 to exit the HVAC case 40 through the front face outlets 94. Airflow from the rear blower 42 also exits through the rear face outlet 84A due to the control module 50 positioning the rear airflow control door 86 to permit airflow through the rear face outlet 84A (and prevent airflow through the rear foot outlet 84B). The control module 50 closes the front foot control door 82 to prevent airflow from exiting through the front foot outlet 80. In the vent mode of FIG. 6, the control module 50 operates the front blower 22 and the rear blower 42 at the same, or generally the same, voltage.

Figure 7:
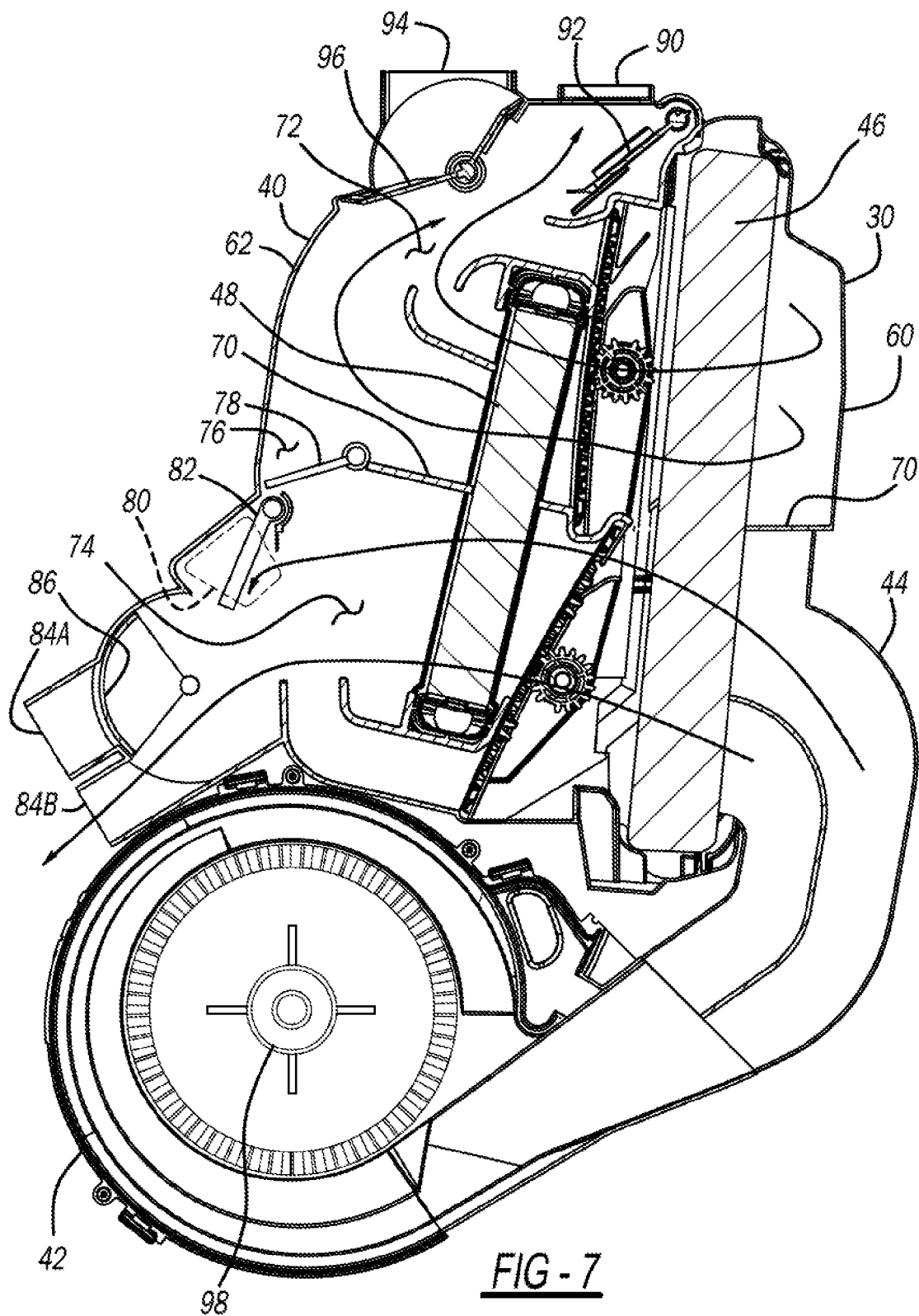
FIG. 7 is a cross-sectional view similar to FIG. 2, but with the HVAC case in a defrost mode.

FIG. 7 illustrates the HVAC case 40 in a defrost mode. In the defrost mode, the control module 50 runs the front and rear blowers 22, 42 at the same, or generally the same, voltage. The control module 50 further opens the defrost outlet control door 92 and closes the bypass door 78. All airflow from the front blower 22 thus exits through the defrost outlet 90. The control module 50 partially closes the front foot control door 82 and positions the rear airflow control door 86 so that airflow from the rear blower 42 heated by the heater core 48 exits the lower portion 74 through both the front foot outlet 80 and the rear foot outlet 84B (the rear airflow control door 86 is positioned to restrict airflow through the rear face outlet 84A).

Figure 8:
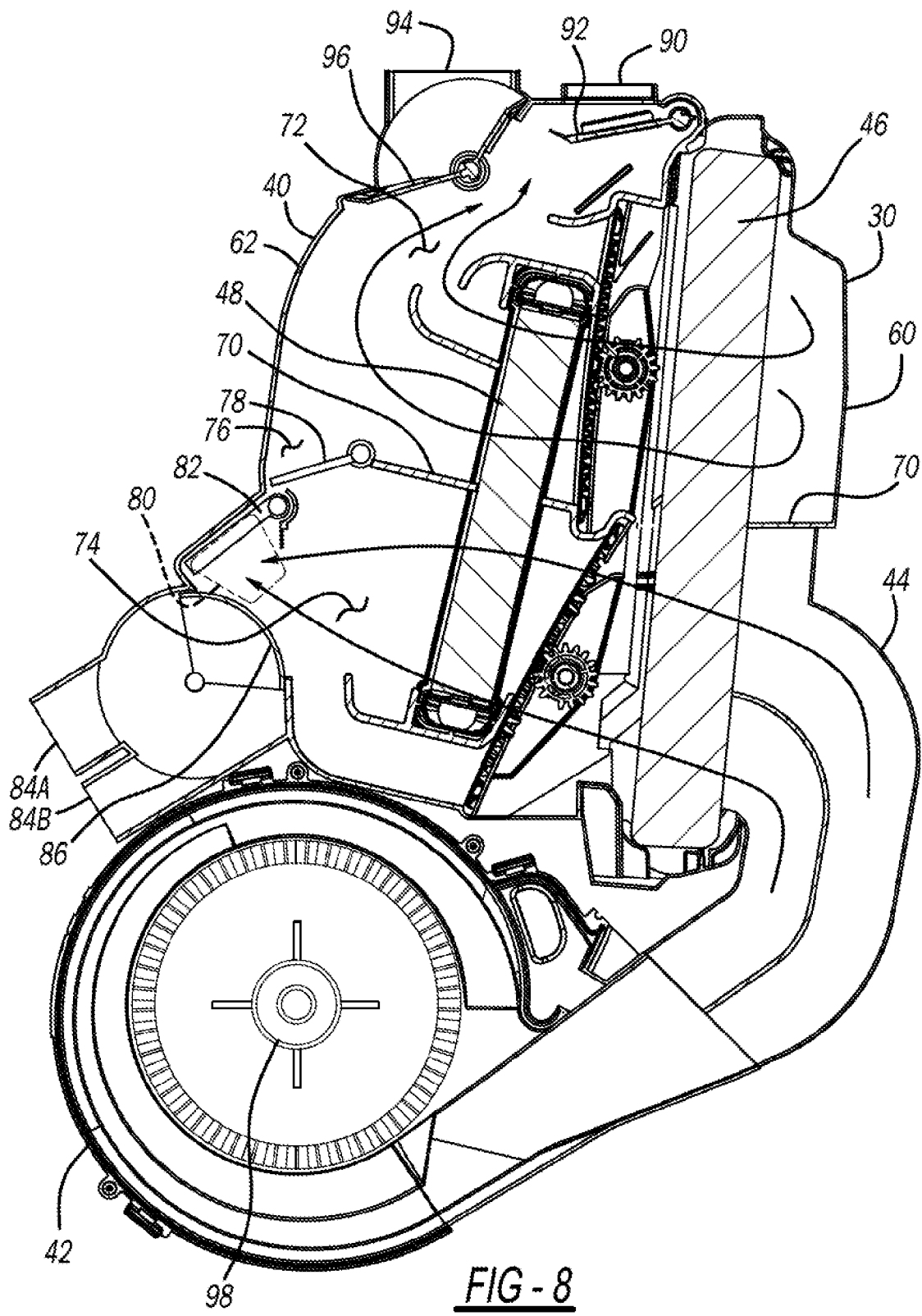
FIG. 8 is a cross-sectional view similar to FIG. 2, but with the HVAC case in a front-only heat mode.

FIG. 8 illustrates the HVAC case 40 in a front only heating mode, such as when there are no rear passengers. Because no rear passengers are present, to conserve energy the control module 50 closes the rear airflow control door 86 and the bypass door 78. The control module 50 opens the front foot control door 82. All airflow generated by the rear blower 42 is thus heated by the heater core 48, and exits the HVAC case 40 through the front foot outlet 80 to heat the lower area of the front passenger cabin. The control module 50 also slightly opens the defrost outlet control door 92 to allow airflow generated by the front blower 22 to exit through the defrost outlet 90 after being heated by the heater core 48. With the rear airflow control door 86 closed, a greater volume of airflow will exit the front foot outlet 80 as compared to when the rear airflow control door 86 is open. Thus to conserve energy, the control module 50 advantageously reduces the voltage of the rear blower 42 when no passengers are present in the rear of the passenger cabin.

The HVAC assembly 10 thus advantageously uses the rear blower 42 to provide all the airflow through the front foot outlet 80, which is recirculated airflow from within the passenger cabin of the vehicle. This achieves the benefits of a two-layer HVAC system whereby recirculated airflow rapidly heats the lower portion of the passenger cabin, and fresh air is drawn in to the upper portion of the passenger cabin to prevent window fogging. Furthermore, front and rear airflow separation is no longer necessary because the rear blower 42 always provides at least some airflow in the heating modes. There is no risk of cold air leaking through the rear blower 42. The front foot outlet 80, front face outlet 84A, and rear foot outlet 84B thus always receive recirculated air from the rear blower 42, and the defrost outlet 90 always receives fresh air from the front blower 22. Furthermore, in the defrost mode of FIG. 7, the greater defrost airflow from the front blower 22 is achieved because the front blower 22 does not need to supply airflow to the outlets 80, 84A, 84B (airflow to the outlets 80, 84A, 84B comes solely from the rear blower 42).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) assembly for a vehicle, the HVAC assembly comprising:
   an HVAC case including:
      an evaporator;
      a rear blower including a rear blower scroll configured to direct airflow generated by the rear blower to a lower portion of the evaporator;
      an airflow conduit configured to direct airflow generated by a front blower to an upper portion of the evaporator;
      an airflow divider separating airflow generated by the rear blower from airflow generated by the front blower, the airflow divider divides the HVAC case into an upper area above the airflow divider and a lower area below the airflow divider;
      a defrost outlet and a front face outlet at the upper area of the HVAC case above the airflow divider; and
      a front foot outlet and a rear airflow outlet at the lower area of the HVAC case below the airflow divider; and
   a front blower case housing the front blower, the front blower case is connected to the HVAC case by the airflow conduit, the front blower is spaced apart from the rear blower;
   wherein the airflow divider is positioned such that all airflow exiting the HVAC case through the front foot outlet is recirculated passenger cabin airflow pushed through the front foot outlet by the rear blower.

2. The HVAC assembly of claim 1, wherein the front foot outlet is at a rear side of the HVAC case.

3. The HVAC assembly of claim 1, wherein the evaporator is positioned such that airflow from the rear blower and airflow from the front blower passes across the evaporator.

4. The HVAC assembly of claim 1, further comprising a heater core extending across the airflow divider.

5. The HVAC assembly of claim 1, further comprising a front foot control door configured to control airflow through the front foot outlet.

6. The HVAC assembly of claim 1, wherein the airflow divider at least partially defines a bypass passage between the upper area and the lower area of the HVAC case, airflow through the bypass passage is controlled by a bypass control door.

7. The HVAC assembly of claim 1, further comprising a control module configured to operate the HVAC case in a rear passenger mode and a front occupant only mode;
   wherein in the rear passenger mode, the control module is configured to open the rear airflow outlet, open the front foot outlet, and run the rear blower at a first speed; and
   wherein in the front occupant only mode, the control module is configured to close the rear airflow outlet, open the front foot outlet, and run the rear blower at a second speed that is slower than the first speed.

8. A heating, ventilation, and air conditioning (HVAC) assembly for a vehicle, the HVAC assembly comprising:
   a front blower case including a front blower; and
   an HVAC case connected to the front blower case by an airflow conduit, the HVAC case including a rear blower that is spaced apart from the front blower, an evaporator, a front foot outlet, and an airflow divider separating airflow generated by the rear blower from airflow generated by the front blower, the airflow divider divides the HVAC case into an upper area above the airflow divider and a lower area below the airflow divider;
   wherein the front foot outlet is below the airflow divider; and
   wherein the airflow divider is positioned such that all airflow exiting the HVAC case through the front foot outlet is recirculated passenger cabin airflow pushed through the front foot outlet by the rear blower.

9. The HVAC assembly of claim 8, wherein the front foot outlet is in line with airflow generated by the rear blower that has passed through the evaporator.

10. The HVAC assembly of claim 8, wherein the HVAC case further includes a rear airflow outlet at the lower area of the HVAC case below the airflow divider, and both a defrost outlet and a front face outlet at the upper area of the airflow divider.

11. The HVAC assembly of claim 8, wherein the airflow conduit is aligned with an upper portion of the evaporator, and a scroll of the rear blower is aligned with a lower portion of the evaporator.

12. The HVAC assembly of claim 8, further comprising a heater core that extends across the airflow divider.

13. The HVAC assembly of claim 8, wherein the airflow divider at least partially defines a bypass passage between the upper area and the lower area of the HVAC case, airflow through the bypass passage is controlled by a bypass control door.

14. The HVAC assembly of claim 8, further comprising a control module configured to operate the HVAC case in a rear passenger mode and a front occupant only mode;
   wherein in the rear passenger mode, the control module is configured to open a rear airflow outlet, open the front foot outlet, and run the rear blower at a first speed; and
   wherein in the front occupant only mode, the control module is configured to close the rear airflow outlet, open the front foot outlet, and run the rear blower at a second speed that is slower than the first speed.

15. A heating, ventilation, and air conditioning (HVAC) assembly for a vehicle, the HVAC assembly comprising:
   a front blower case including a front blower; and
   an HVAC case connected to the front blower case by an airflow conduit, the HVAC case including:
      a rear blower spaced apart from the front blower;
      an airflow divider separating airflow generated by the rear blower from airflow generated by the front blower, the airflow divider divides the HVAC case into an upper area above the airflow divider and a lower area below the airflow divider;
      a defrost outlet and a front face outlet at the upper area of the HVAC case above the airflow divider; and
      a front foot outlet and a rear airflow outlet at the lower area of the HVAC case below the airflow divider;
      wherein the airflow divider is positioned such that all airflow exiting the HVAC case through the front foot outlet is recirculated passenger cabin airflow pushed through the front foot outlet by the rear blower.

16. The HVAC assembly of claim 15, wherein the airflow conduit is aligned with an upper portion of an evaporator of the HVAC case, and a scroll of the rear blower is aligned with a lower portion of the evaporator.

* * * * *